United States Patent Office 3,432,299

Patented Mar. 11, 1969

3,432,299

PLANOGRAPHIC MANDRELS

Thomas R. Bates, Rochester, N.Y., assignor to Eastman Kodak Company, Rochester, N.Y., a corporation of New Jersey No Drawing. Filed Dec. 1, 1964, Ser. No. 415,177
U.S. Cl. 96—36 14 Claims
Int. Cl. G03c 5/00; C23b 7/00

ABSTRACT OF THE DISCLOSURE

Preparation of long-lasting planographic mandrels by producing a photo-resist image on a bimetal plate which is then etched in two stages, the first etching the surface metal, the second etching the base metal so that the surface metal forms a ledge over the etched areas of the base metal, and filling the etched areas with a dielectric material which is securely fixed into position by the surface metal ledge.

The present invention relates to a method for the preparation of planographic mandrels, and more particularly to a method for the preparation of planographic mandrels adaptable for the electroforming of metal parts.

In the electroforming industry, one of the presently employed processes for preparing planographic mandrels having relatively large-scale detail utilizes a conventional chemical milling or etching operation. However, because of various considerations, this method is not feasible for producing mandrels of fine detail.

One method of preparing mandrels of fine detail consists of using a stainless-steel metal block. The block is etched with the desired pattern, and then the etched area is filled with a dielectric material. The metal parts are then electroformed from the etched and filled metal block. However, with this method there is a tendency to lose dimensional tolerances during the etching operation. There is some problem also with filling the etched area with the dielectric material in order that the edges of the electroformed parts are completely smooth and free of raised-edge effects. Furthermore, the dielectric material may tend to become dislodged from the etched mandrel, resulting in a failure of the mandrel at that point. It is readily apparent that failure at any point will completely destroy the usefulness of the mandrel.

Other methods of electroforming metal parts are known in the art, but these methods have the common disadvantage of only being usable for one or two times. Therefore, it is highly desirous in the electroforming industry to develop a method of preparing fine detailed mandrels which will be relatively free of the above-listed disadvantages as well as reusable for many electroforming operations.

One object of my invention is a method of preparing superior planographic mandrels for electroforming metal parts of fine detail and which may be reused many times. Another object of my invention is to provide a method of preparing mandrels for electroforming which will maintain exact size and reproduce fine detail with a high degree of uniformity. Still another object of my invention is to provide a method of preparing a smooth planographic surface free of edge defects. Other objects of my invention will appear herein.

These objects are accomplished by producing a photo-resist image on a bimetal plate which is then etched in two stages and filled with a dielectric material to form a mandrel useful in electroforming various metal parts.

The following is a general description of the procedure to be used in preparing the mandrel. However, this is not to be taken in limitation of my invention in any aspect.

A photographic reproduction of the metal part to be electroformed is first formed by a conventional procedure, such as by exposing and processing photographic film to form a negative. Separately, a rigid sheet of metal (herein referred to as the base metal) is plated on at least one side with another metal (herein referred to as the surface metal). A photo-resist solution (for example, a light-sensitized polymeric material) is then coated over the entire area of the surface metal to form a light-sensitive photo-resist coating thereon.

The light-sensitive photo-resist coating is then exposed to the image contained in the negative. The resist coating becomes thereby hardened in the exposed areas, after which it is developed and, by washing, the unexposed (unhardened) resist material is removed. These methods are carried out by well known processes, such as those described in U.S. Patent 2,610,120. The resist image is now in relief upon the bimetal plate.

The surface metal in the non-image areas is then etched away by a conventional etching method using an etchant which will not affect, that is, there is no substantial etching of, the base metal. Then the first etching solution is washed off, and a second etchant which does not appreciably affect the surface metal is employed to etch the base metal. When the second etching operation is complete (the base metal has been etched a desired number of mils and the like), that etchant is washed off. The exposed resist is then removed by a method such as outlined in U.S. Patent 2,610,120.

It is known that there is some lateral etching as well as downward etching in a conventional etch process. Thus, the etched-out area will have a somewhat "bulging" appearance, and the surface metal will form somewhat of a ledge over the etched area of the base metal. I use this to good advantage as will be described later.

The etched areas are now filled with a dielectric material in order to prevent electroforming on these areas. It will be apparent that electroformed metal parts having different degrees of surface relief can be produced merely by varying the amount of dielectric fill which is to be used. Care must be taken, however, to allow for any tendency of the dielectric material to shrink when dried and hardened. This is conveniently done by using additional material at the onset. It is at this point that the above-described lateral etch and subsequent ledge formation play an important role in my invention. The ledge acts to actually lock the dielectric fill substance in place. This prevents the fill from falling out and, as a result, a long lasting mandrel having a high degree of dimensional stability is obtained.

An additional step in the preparation of the mandrel may be necessary in order to render its surface one from which the electroformed metal parts may be easily stripped. This usually involves electroplating on the surface of the mandrel a flash of another metal. This is done with the dielectric material in place and makes for ease of stripping the electroformed metal parts from the mandrel.

The two-stage etching operation of my invention is a critical feature thereof and performs two essential functions:

(1) Gives excellent image detail for the mandrel surface, and (2) Provides good etch depth in the base metal in order to accommodate the fill with the dielectric material.

When the above-outlined procedure is completed, the mandrel is ready for service, and metal parts may be electroformed therefrom.

The choice of metals which will form the bimetal plate is limited to those metals which satisfy two requirements. The metals must provide an etch-rate differential; that is, the first etchant must etch substantially only the surface metal and the second substantially only the base metal. Furthermore, the metal chosen to be the surface metal must be one from which the electroformed parts may be easily stripped. Among the combinations which I have found suitable for my invention are nickel on copper and silver on copper. Other metals convenient for use as surface or base metals include aluminum, stainless steel, and chromium, in various combinations with each other or with nickel, silver, or copper.

Examples of some of the photo-resist materials which may be successfully employed in the practice of my invention are given in U.S. Patents 2,610,120 and 2,732,301. Among the more effective photo-resist compositions for my invention are polyvinyl cinnamate sensitized by 2-chloro-4-nitro aniline and polyvinyl cinnamate sensitized by 2,4,6-trinitroaniline.

The etching solutions of my invention must be chosen with reference to the metals which will form the bimetal plate. Each etchant must affect only the metal unaffected by the other etchant. As examples, if a bimetal combination is nickel on copper, the first and second etchants could conveniently be ferric chloride and ammonium persulfate, respectively; if the bimetal combination is silver on copper, the first and second etchants could conveniently be ferric nitrate and ferric chloride, respectively. The etching compositions of my invention are conventional ones, and the characteristics of each are well known to those skilled in the art.

The nature of the dielectric material which is used to fill the etched areas plays an important role in determining smoothness of the boundaries of electroformed parts. It is important to use a dielectric fill material which will withstand repeated use in electroforming operations and which will not shrink away from the metal surfaces and mandrel sidewalls in electroforming operations.

Any dielectric material which is non-conductive, solid at the electroforming bath temperature, and insoluble in the electroforming bath solution may be successfully employed as the fill material in my invention. Among the materials which I have found to be very satisfactory as dielectric fills are the following:

(1) Epoxy resins especially as prepared by condensation of polymerized unsaturated fatty acids with aliphatic amines as shown in U.S. Patent 2,705,223 and sold by General Mills under the trade name Versamide 125;

(2) Alkyd type synthetic resins such as are sold by General Mills under the trade name Glyptal;

(3) Styrene butadiene latex polymer such as that sold by Goodyear Rubber Company under the trade name Polymer S5B;

(4) Synthetic latex rubber of the butadiene-acrylonitrile polymer type such as that sold by Goodyear Rubber Company under the trade name Chemigum; and (5) Diallyl phthalate synthetic resin such as sold by F.M.C. Corporation under the trade name Dapon M.

Various formulations of industrial cements have also been found to be satisfactory as dielectric fills in my invention. It should be noted again that any possible shrinkage should be allowed for when using the dielectric fill material.

The general procedure for filling the etched areas of the mandrel with the dielectric material would involve pouring the heated dielectric into the etched areas, leaving a small amount of excess fill at the top to allow for shrinkage. The metal is then cooled and hardened, after which the excess is removed by a procedure such as sanding, grinding, and the like.

The various mechanics, techniques, and procedures used in the electroplating, electroforming, and etching operations of my invention are carried out by conventional methods well known to those skilled in the art.

The following specific examples will serve to more fully illustrate the basic practices and procedures of my invention. However, it will be understood that these are only examples of some of the embodiments which my invention may assume and not to be taken in limitation of the invention in any aspect.

Example I

A negative reproduction of a metal sheet having a fine screen pattern of the type used in an electric shaver head is first prepared.

Next a rigid sheet of copper is electroplated with about 2 mils of nickel, after which a photo-resist solution of polyvinyl cinnamate sensitized by 2,4,6-trinitroaniline is coated on the bimetal plate. The light-sensitive photo-resist coating is exposed to the image contained in the negative, thus hardening the exposed areas, after which it is developed and the unexposed resist is washed away.

The nickel is completely etched through with a solution of ferric chloride, the copper being unaffected. The copper is then etched with a solution of ammonium persulfate to a total depth of 10 mils, and the remaining resist is washed away. The etched areas are then filled with a heated dielectric styrene-butadiene latex polymer such as described above, allowing a little excess on the surface. The dielectric is cooled and hardened, with the excess then being removed.

The mandrel is thus completed and is used in the electroforming of nickel sheets useful as electric shaver heads. The nickel parts produced are of good quality and have no surface or edge defects. The mandrel performed in a very effective manner and exhibited no loss of properties upon repeated use.

Example II

The procedure of Example I was repeated with the following exceptions. The metal-on-metal combination was silver on copper, the first and second etching solutions were ferric nitrate and ferric chloride, respectively, and the dielectric fill material was an epoxy resin prepared by condensation of a polymerized unsaturated fatty acid with an aliphatic amine as shown in U.S. Patent 2,705,223. The mandrel thus prepared was used in forming nickel sheets of the type used in an electric shaver head. The electroformed parts were again of good quality and had no surface or edge defects. Each of the mandrels performed in the same manner as those in Example I.

While the above description and examples have been confined to an image formation process through the use of a light-sensitive photo-resist material, my invention will be understood to include other methods of forming a hardened resistive image. Examples of other methods would be image formation by a hardenable washoff emulsion process, image formation by a gel transfer process, and the like.

Although my invention has been described in considerable detail with particular reference to certain preferred embodiments thereof, it will be understood that variations and modifications can be effected within the spirit and scope of the invention as described hereinbefore and as defined in the appended claims.

I claim:

1. A process of preparing mandrels adapted for the electroforming of metal parts, said process comprising the steps of:

(1) forming a bimetal plate from which an electroformed part may be stripped, the metals of said plate having an etch rate differential;

(2) coating said bimetal plate with a hardenable light-sensitive material;

(3) exposing said coating so that a hardened image is created in the exposed areas;

(4) removing the unexposed, unhardened areas of the coating;

(5) etching through the surface metal but not affecting the base metal;

(6) etching the base metal to a specified depth;

(7) removing the hardened image from the bimetal plate; and (8) filling the etched areas with a dielectric fill material, said material being insoluble in the electroforming bath.

2. The process as defined in claim 1 wherein the bimetallic plate consists of nickel on copper.

3. The process as defined in claim 1 wherein the bimetallic plate consists of silver on copper.

4. The process as defined in claim 1 wherein the bimetallic plate consists of nickel on copper and the first and second etchants are ferric chloride and ammonium persulfate, respectively.

5. The process as defined in claim 1 wherein the bimetallic plate consists of silver on copper and the first and second etchants are ferric nitrate and ferric chloride, respectively.

6. The process as defined in claim 1 wherein the hardenable light-sensitive material is composed of polyvinyl cinnamate sensitized by 2,4,6-trinitroaniline.

7. The process as defined in claim 1 wherein the hardenable light-sensitive material is composed of polyvinyl cinnamate sensitized by 2-chloro-4-nitro aniline.

8. The process as defined in claim 1 wherein the dielectric fill material is an epoxy resin, especially as prepared by condensation of a polymerized unsaturated fatty acid with an aliphatic amine.

9. The process as defined in claim 1 wherein the dielectric fill material is composed of an alkyd synthetic resin.

10. The process as defined in claim 1 wherein the dielectric fill material is composed of a synthetic latex rubber polymer.

11. The process as defined in claim 1 wherein the dielectric fill material is composed of a styrene-butadiene synthetic latex polymer.

12. The process as defined in claim 1 wherein the dielectric fill material is a butadiene-acrylonitrile synthetic latex polymer.

13. The process as defined in claim 1 wherein the dielectric fill material is composed of a diallyl phthalate synthetic resin.

14. A process for preparing mandrels adapted for the electroforming of metal parts said process comprising:

(a) treating a plate having at least a layer of first metal and a layer of second metal disposed on and firmly adhered to the first metal said first and second metals having an etch rate differential, to form a photoresist image on the second metal;
(b) etching through the second metal in areas not protected by resist with an etchant which will not appreciably affect the first metal;
(c) etching the first metal to a desired depth with an etchant which will not appreciably affect the second metal;
(d) removing the resist material; and
(e) filling the etched areas with dielectric material.

References Cited

UNITED STATES PATENTS

| | | | |
|---|---|---|---|
| 2,226,382 | 12/1940 | Norris | 204—281 |
| 2,225,733 | 12/1940 | Beebe | 96—36.2 |
| 2,250,436 | 7/1941 | Norris | 204—281 |
| 2,610,120 | 9/1952 | Minsk et al. | 96—115 |

NORMAN G. TORCHIN, *Primary Examiner.*

R. E. MARTIN, *Assistant Examiner.*

U.S. Cl. X.R.

96—38.2; 156—3; 204—281